United States Patent [19]

Oakley et al.

[11] Patent Number: 5,480,863

[45] Date of Patent: Jan. 2, 1996

[54] BRINE VISCOSIFICATION

[75] Inventors: Johnna E. Oakley, Caney, Kans.; Kelly B. Fox, Bartlesville, Okla.; Alvin Evans, Jr., Bartlesville, Okla.; Wayne S. Stewart, Bartlesville, Okla.

[73] Assignee: Phillips Petroleum Company, Bartlesville, Okla.

[21] Appl. No.: 18,133

[22] Filed: Feb. 16, 1993

[51] Int. Cl.$^6$ .............................. C09K 7/00; E21B 43/00
[52] U.S. Cl. ........................... 507/225; 507/240; 507/272
[58] Field of Search ....................... 252/8.551; 507/225, 507/240, 272

[56] References Cited

U.S. PATENT DOCUMENTS

| | | | |
|---|---|---|---|
| 4,151,096 | 4/1979 | Jackson . | |
| 4,415,463 | 11/1983 | Mosier et al. . | |
| 4,422,947 | 12/1983 | Dorsey et al. . | |
| 4,496,468 | 1/1985 | House et al. . | |
| 4,540,498 | 9/1985 | Wu et al. ............................ | 252/8.55 D |
| 4,554,081 | 11/1985 | Borchardt et al. . | |
| 4,609,476 | 9/1986 | Heilweil . | |
| 4,619,773 | 10/1986 | Heilweil et al. . | |
| 4,626,363 | 12/1986 | Gleason et al. . | |
| 4,752,404 | 6/1988 | Burns et al. ........................... | 252/8.553 |
| 5,116,923 | 5/1992 | Bock et al. ........................... | 526/307.2 |
| 5,310,002 | 5/1994 | Blauch et al. ........................... | 166/307 |
| 5,342,530 | 8/1994 | Aften et al. . | |

OTHER PUBLICATIONS

McCormick et al, "Water–Soluble Copolymers. IV. Random Copolymers of Acrylamide with Sulfonated Comonomers", Journal of Polymer Science, Polymer Chemistry Edition, vol. 20, 817–838 (1982), John Wiley and Sons, Inc.

Primary Examiner—Richard D. Lovering
Assistant Examiner—Joseph D. Anthony
Attorney, Agent, or Firm—Lucas K. Shay

[57] ABSTRACT

A process for increasing the viscosity of a zinc compound-containing brine which can be used for workover and completion fluids in oil field operations is provided. The process comprises contacting the zinc compound-containing brine with a polymer which comprises repeating units derived from an unsaturated amide having the formula of $CH_2=CH-R-C(O)-NH_2$ and a vinylic sulfur compound selected from the group consisting of $CH_2=CH-R'-SO_3M$, $CH_2=CH-R''-C(O)-N(H)-R'''-SO_2M$, and mixtures thereof; wherein M is selected from the group consisting of hydrogen, an alkali metal, and combinations thereof; and R is selected from the group consisting of hydrogen, a hydrocarbyl radical having from 1 to about 20 carbon atoms, and combinations thereof.

22 Claims, No Drawings

BRINE VISCOSIFICATION

FIELD OF THE INVENTION

The present invention relates to viscosifying brines.

BACKGROUND OF THE INVENTION

The use of brines in workover and completion fluids in oil field operations is well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Chemicals are added to the brines for various reasons that include, but are not limited to, increasing viscosity, reducing corrosion, and increasing the density of the brine. For example, in order to obtain a brine having a salinity of about 14.5 to 15.5 pounds per gallon, zinc bromide is often added to the brine. Chemicals such as, for example, water-thickening polymers serve to increase the viscosity of the brines, when used as workover fluids or completion fluids, to retard the migration of the brines into the formation and to lift drilled solids from the wellbore.

A variety of water-thickening polymers have been used to increase the viscosity of brines that do not contain zinc compounds. Examples of such water-thickening polymers include hydroxyethyl cellulose, carboxylmethylhydroxyethyl cellulose, carboxymethyl cellulose, polysaccharides such as xanthan gum, and polyacrylamide. However, these polymers do not viscosify, or increase the viscosity of, brines that contain zinc ions in the range of 0.1% to 7%. Because zinc compound-containing brines are widely used as workover fluids or completion fluids in oil field operations, development of a process for viscosifying the brines is highly desirable.

SUMMARY OF THE INVENTION

Therefore, an object of the invention is to provide a polymer that can viscosify a brine which contains a zinc compound. Another object of the invention is to provide a brine composition useful for workover or completion fluid. A further object of the invention is to provide a process for preparing the brine composition. Still another object of the invention is to provide a process for viscosifying a brine which contains a zinc compound. Other objects, features, and advantages will become more apparent as the invention is more fully disclosed hereinbelow.

According to the present invention, a process for viscosifying a zinc compound-containing brine is provided which comprises contacting a polymer with a zinc compound-containing brine where the polymer comprises repeating units derived from at least an unsaturated amide having the formula of $CH_2=C(R)-C(O)-N(R)(R)$ and at least a vinylic sulfur-containing compound selected from the group consisting of $CH_2=C(R)-SO_3M$, $CH_2=C(R)-R'-SO_3M$, $CH_2=C(R)-R''-C(O)-NH-R'''-SO_3M$, $CH_2=C(R)-C(O)-NH-R'''-SO_3M$ and mixtures thereof; wherein M is selected from the group consisting of hydrogen, an alkali metal, and combinations thereof.

DETAILED DESCRIPTION OF THE INVENTION

The present invention deals with increasing the viscosity of a brine which may contain a zinc compound by contacting a polymer with the brine so that the thus-viscosified brine can be used in workover or completion fluids. The brine may be any brines used in oil field operations.

The zinc compound present in the brine can be any zinc salt. The zinc compound can be present in the brine as an additive or as a contaminant. Examples of zinc compounds used as au additive include, but are not limited to, zinc chloride, zinc bromide, zinc iodide, zinc sulfate, and mixtures thereof. The presently preferred zinc compounds are zinc chloride and zinc bromide because of low cost and ready availability.

According to the present invention, the weight % of the zinc compound in the brine can vary widely up to about 20%, preferably from about 0.01% to about 7%, and most preferably from 0.1% to 5% for best results when the brine is used for workover or completion fluid. The brine can also contain a variety of other salts such as, for example, sodium chloride, sodium bromide, potassium chloride, potassium bromide, calcium chloride, calcium bromide, and magnesium chloride. Generally the weight % of the total dissolved solids in the brine is in the range of from about 0.5% to about 80%.

The term polymer used herein and useful as viscosifier for the brine denotes, unless otherwise indicated, a copolymer, a terpolymer, or tetrapolymer. The polymer comprises repeating units derived from at least an unsaturated amide having the formula of $CH_2=C(R)-C(O)-N(R)(R)$ and at least a vinylic sulfur-containing compound is selected from the group consisting of $CH_2=C(R)-SO_3M$, $CH_2=C(R)-R'-SO_3M$, $CH_2=C(R)-R''-C(O)-NH-R'''-SO_3M$, $CH_2=C(R)-C(O)-NH-R'''-SO_3M$, and mixtures thereof. In the formulae, R, R', R", R''' can be the same or different and are each selected from the group consisting of hydrogen, a hydrocarbyl radical having from 1 to about 20 carbon atoms, and combinations thereof. Each hydrocarbyl radical can be an alkylene radical, an aryl radical, an arylalkyl radical, or an alkaryl radical, or mixtures thereof. Examples of suitable unsaturated amides include, but are not limited to, acrylamide, methacrylamide, N,N-dimethylscrylamide, and mixtures thereof. The presently preferred unsaturated amide is acrylamide. Examples of suitable vinylic sulfur-containing compounds include, but are not limited to, vinylsulfonic acid, styrenesulfonic acid, vinyltoluene sulfonic acid, 2-acrylamido-2-methylpropane-sulfonic acid, 2-methacryloyloxyethane-sulfonic acid, an alkali salt thereof, and mixtures thereof. The presently preferred vinylic sulfur-containing compound is sodium 2-acrylamido-2-methylpropanesulfonate. As used in the present invention, the term "alkali salt" is referred to generically, unless otherwise indicated, to mean a salt containing a lithium, sodium, potassium, or ammonium cation. The molar ratio of the unsaturated amide to the vinylic sulfur-containing compound is generally in the range of from about 0.1:1 to about 60:1, preferably from about 0.5:1 to 30:1, and most preferably from 1:1 to 5:1. Any form of polymer can be used in the present invention. However, it is preferred that the polymer be an emulsion polymer. Most preferably an invert emulsion polymer, i.e., oil is the outside phase, can be used in the present invention for best results.

Any suitable methods for synthesizing a copolymer can be employed to prepare the polymers used in the present invention. The preferred methods for preparing the polymers used in the invention are the processes using various free radical polymerization initiators known to those skilled in the art. Well known azo compounds such as, for example, azo-bisisobutyronitrile, and well known organic or inorganic peroxides such as, for example, t-butyl peroxypivalate and hydrogen peroxide, commonly employed to initiate free radical polymerization can be mixed with the unsaturated amides and vinylic sulfur-containing compounds in the desired molar ratios disclosed above in an aqueous solution or an invert emulsion under suitable polymerization conditions to prepare the polymers used in the invention. Such other methods of polymerization as would have occurred to one skilled in the art can also be employed. Furthermore, the polymers suitable for use in the present invention are commercially available from Phillips Petroleum Company, Bartlesville, Okla.

A surfactant can also be used in the brine to facilitate the inversion of the emulsion polymer used in the invention. Examples of suitable surfactants include, but are not limited to, quaternary ammonium compounds such as for example dimethyl alkyl($C_{14}$–$C_{18}$) benzyl ammonium chloride, dimethyl alkyl($C_{12}$–$C_{16}$) benzyl ammonium chloride, dimethyl alkyl($C_{10}$–$C_{18}$) benzyl ammonium chloride; alkoxylated alcohols such as for example TERGITOL® 15-S-7 (marketed by Union Carbide Corporation) having the formula of $R^1(CH_2CH_2O)_7H$; an alkoxylated mercaptan such as for example AQUA-CLEEN® II (marketed by Phillips Petroleum Company, t-dodecyl sulfenyl polyethylene oxide); and mixtures thereof the presently preferred surfactant is a dimethyl alkyl($C_{12}$–$C_{16}$) benzyl ammonium chloride which is commercially available from Sherex Chemical Company under the tradename of ARIQUAT 80 MC.

According to the present invention, any suitable means such as, for example, mixing with a typical oil field drilling fluid mixing equipment, can be used for the contacting of the polymers, in the presence or absence of a surfactant, with the brines containing a zinc compound to viscosify the brines.

The viscosified brines now having a desired viscosity can be used for workover or completion fluids in oil field operations by those skilled in the art. Generally, the viscosified brines can be used in any drilled wells having a temperature in the range of from about 80° F. (26.66° C.) to about 300° F. (148.88° C.).

Examples described hereinbelow are intended to further illustrate the present invention and should not be construed as more limiting than the appended claims.

EXAMPLE I

This example illustrates that a variety of polymers that are commonly known to increase the viscosity of brines free of, or containing over about 5 weight % of a zinc compound failed to viscosify brines containing a zinc compound within the range of from about 0.1% to about 5%.

The runs were carried out with brines having densities and compositions noted in detail in Table I. These brines were formulated by blending brines of different compositions. For example, a density of 15 pounds (6.804 kg) per gallon (3.78 l) (hereinafter referred to as ppg) was made by mixing 32 ml of a $ZnBr_2$ brine (56 weight % $ZnBr_2$ and 24 weight % $CaBr_2$) having a density of 19.2 ppg and 168 ml of a $CaBr_2$ having a density of 14.2 ppg. The resulting brine had a zinc ion concentration of 3.3 weight %.

Each of the individual polymers shown in Table I was then added to 200 ml of each brine to reach the final polymer concentrations as noted in Table I. Each polymer was thoroughly dispersed into the brine containing zinc bromide by stirring with a Hamilton Beach malt mixer for 20 minutes. Viscosity for each brine-polymer mixture was tested, with a FANN 35 viscometer, immediately after mixing and after some mixtures had aged at 25° C. for 2 days. The results are shown in Table I.

TABLE I

| | | | Viscosities of Brines | | | | |
|---|---|---|---|---|---|---|---|
| Run | Brine[a] Density ppg | $Zn^{+2}$ (Weight %) | Polymer Type | Polymer ppb[b] | Surf[c] (Vol %) | AV[d] | Aged AV[d] |
| 1 | 12.77 | 0.0 | HEC-25[e] | 1.5 | 0 | 24.0 | |
| 2 | 12.77 | 0.0 | AM:AMP[f] | 1.5 | 0.9 | 12.5 | |
| 3 | 12.77 | 0.0 | AM:AMP | 3.0 | 0.9 | 14.0 | |
| 4 | 12.77 | 0.0 | AM:AMP | 4.5 | 0.9 | 23.5 | |
| 5 | 12.77 | 0.0 | AM:AMP | 6.0 | 0.9 | 42.5 | |
| 6 | 15.0 | 3.3 | None | 0 | 0 | 6.0 | |
| 7 | 15.0 | 3.3 | HEC-25 | 1.5 | 0 | 6.5 | 7.0 |
| 8 | 15.0 | 3.3 | HEC-25 | 1.5 | 0 | 6.5 | 7.5 |
| 9 | 15.0 | 3.3 | HEC-25 | 6.3 | 0 | 8.5 | |
| 10 | 15.0 | 3.3 | HEC-25 | 8.0 | 0.9 | 8.5 | |
| 11 | 15.0 | 3.3 | AM:AMP | 1.5 | 0 | 8.0 | 12.5 |
| 12 | 15.0 | 3.3 | AM:AMP | 6.3 | 0 | 73.0 | |
| 13 | 15.0 | 3.3 | AM:AMP | 3.0 | 0 | 11.0 | |
| 14 | 15.0 | 3.3 | AM:AMP | 4.2 | 0.9 | 42.5 | |
| 15 | 15.0 | 3.3 | AM:AMP | 8.0 | 0.9 | >300.0 | |
| 16 | 19.2 | 16.3 | None | 0 | 0 | 6.0 | |
| 17 | 19.2 | 16.3 | HEC-25 | 1.5 | 0 | 16.0 | |

TABLE I-continued

Viscosities of Brines

| Run | Brine[a] Density ppg | $Zn^{+2}$ (Weight %) | Polymer Type | Polymer ppb[b] | Surf[c] (Vol %) | AV[d] | Aged AV[d] |
|---|---|---|---|---|---|---|---|
| 18 | 19.2 | 16.3 | HEC-25 | 1.5 | 0.9 | 17.5 | |
| 19 | 19.2 | 16.3 | HEC-25 | 4.5 | 0 | 21.0 | 40.0 |
| 20 | 19.2 | 16.3 | HEC-25 | 4.5 | 0.9 | 50.5 | 84.5 |
| 21 | 19.2 | 16.3 | AH:AMP | 1.5 | 0.9 | 9.0 | |
| 22 | 19.2 | 16.3 | AM:AMP | 4.5 | 0.9 | 15.0 | 46.0 |

[a]Brine compositions:
12.77 ppg
44.8% CaBr2
15.0 ppg
11.5% ZnBr2
47.1% CaBr2
19.2 ppg
56.0% ZnBr2
24.0% CaBr2
[b]Active polymer concentration in pounds per barrel (ppb).
[c]Surf - "Surfactant" used was dimethyl alkyl ($C_{12}$-$C_{16}$) benzyl ammonium chloride in isopropyl alcohol and water.
[d]AV - "Apparent Viscosity" is determined by dividing the 600 rpm reading on the FANN 35 Viscometer by two. Aging was carried out at 25° C. for 48 hours.
[e]HEC-25, hydroxyethyl cellulose.
[f]AM:AMP, a copolymer of acrylamide and sodium 2-acrylamide-2-methylpropane sulfonate (68 and 32 mole %, respectively).

Table I demonstrates that the hydroxyethyl cellulose, well-known to increase the viscosity of brines that do not contain a zinc compound (run 1) failed to increase the viscosity of brines containing 3.3% $Zn^{+2}$ (runs 7–9), even after 2 days aging at 25° C. (run 7). Table I also demonstrates that hydroxyethyl cellulose increased the viscosity of brines containing 16.3% zinc ions.

Table I also shows that the copolymer of acrylamide and sodium 2-acrylamido-2-methylpropane sulfonate (hereinafter referred to as copolymer AM:AMP) viscosified the brines containing no zinc compound (runs 2–5), 3.3 weight % zinc compound (runs 10–15), and high content of zinc compound (16 weight %, runs 21–22). These results demonstrate that copolymer AM:AMP was an excellent viscosifier for brines used as workover or completion fluids in oil field applications. Table I further demonstrates that the presence of a surfactant in the brines promoted the viscosity development.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed is:

1. A composition comprising a zinc bromide-containing brine, a viscosifying copolymer of acrylamide and sodium 2-acrylamido-2-methylpropanesulfonate, and a surfactant of dimethyl alkyl benzyl ammonium chloride wherein the alkyl has 12 to 16 carbon atoms; wherein said viscosifying copolymer is the only viscosifying polymer present in the said composition.

2. A composition comprising a surfactant, a zinc compound-containing brine, and a viscosifying polymer wherein said viscosifying polymer consists essentially of repeating units derived from an unsaturated amide having the formula of $CH_2$=C(R)—C(O)—$NH_2$ and a vinyl sulfur-containing compound selected from the group consisting of $CH_2$=C(R)—$SO_3$M, $CH_2$=C(R)—R'$SO_3$M, $CH_2$=C(R)—R"—C(O)—NH—R'"—$SO_3$M, $CH_2$=C(R)—C(O)—NH—R'"—$SO_3$M, and combinations thereof; M is selected from the group consisting of hydrogen, alkali metals, and combinations thereof; R is selected from the group consisting of hydrogen, hydrocarbyl radicals having 1 to about 20 carbon atoms, and combinations thereof; and R', R", and R'" are each selected from the group consisting of hydrocarbyl radicals having 1 to about 20 carbon atoms, and compositions thereof; wherein said polymer is the only polymer present in the said composition wherein said viscosifying polymer is the only viscosifying polymer present in the said composition.

3. A composition according to claim 2 wherein said zinc compound is zinc bromide.

4. A composition according to claim 2 wherein said unsaturated amine is acrylamide.

5. A composition according to claim 2 wherein said vinylic sulfur-containing compound is sodium 2-acrylamido-2-methylpropanesulfonate.

6. A process for viscosifying a brine containing zinc bromide, in the presence of a surfactant, comprising mixing a viscosifying copolymer of acrylamide and sodium 2-acrylamido-2-methylpropanesulfonate acid with said brine in the presence of a surfactant wherein the molar ratio of acrylamide to sodium 2-acrylamido-2-methylpropanesulfonate acid is from 1:1 to 5:1 and the weight % of zinc bromide in said brine is 0.1 to 5%; wherein said copolymer is the only polymer present in the said process for viscosifying a brine wherein said copolymer is the only viscosifying polymer present in the said process for viscosifying a brine.

7. A process for viscosifying a brine comprising contacting a viscosifying polymer in the presence of a surfactant with said brine wherein said viscosifying polymer consists essentially of repeating units derived from at least one unsaturated amide having the formula of $CH_2$=CH(R)—C(O)—N(R)(R) and at least one vinylic sulfur-containing compound selected from the group consisting of $CH_2$=C(R)—$SO_3$M, $CH_2$=C(R)—R'$SO_3$M, $CH_2$=C(R)—R"—C(O)—NH—R'"—$SO_3$M, $CH_2$=C(R)—C(O)—NH—R'"—$SO_3$M, and combinations thereof; M is selected from the group consisting of hydrogen, alkali metals, and combinations thereof; each R is selected from the group consisting of hydrogen, hydrocarbyl radicals having 1 to about 20 carbon atoms, and combinations thereof; and R', R", and R''' are each selected from the group consisting of hydrocarbyl radicals having 1 to about 20 carbon atoms, and combinations thereof; wherein said polymer is the only polymer present in the said process for viscosifying a brine wherein said viscosifying polymer is the only viscosifying polymer present in the said process for viscosifying a brine.

8. A process according to claim 7 wherein said surfactant is dimethyl alkyl benzyl ammonium chloride which is a quaternary ammonium compound wherein the alkyl has 12 to 16 carbon atoms.

9. A process according to claim 7 wherein said polymer is a copolymer of acrylamide and sodium 2-acrylamido-2-methylpropanesulfonate.

10. A process according to claim 7 wherein said polymer is an emulsion polymer.

11. A process according to claim 7 wherein said polymer is an invert emulsion polymer.

12. A process according to claim 7 wherein said brine comprises a zinc compound.

13. A process according to claim 12 wherein the weight % of said zinc compound in said brine is in the range of from about 0.01% to about 7%.

14. A process according to claim 13 wherein said range is from about 0.1% to about 5%.

15. A process according to claim 7 wherein said unsaturated amide is selected from the group consisting of acrylamide, methacrylamide, N,N-dimethylacrylamide, and mixtures thereof.

16. A process according to claim 15 wherein said unsaturated amide is acrylamide.

17. A process according to claim 7 wherein said vinylic sulfur-containing compound is selected from the group consisting of vinylsulfonic acid, styrenesulfonic acid, vinyltoluene sulfonic acid, 2-acrylamido-2-methylpropanesulfonic acid, 2-methacryloyloxyethanesulfonic acid, an alkali salt thereof, and combinations thereof.

18. A process according to claim 17 wherein said vinylic sulfur-containing compound is an alkali salt of 2-acrylamido-2-methylpropanesulfonic acid.

19. A process according to claim 18 wherein said alkali salt of 2-acrylamido-2-methylpropanesulfonic acid is sodium 2-acrylamido-2-methylpropanesulfonate.

20. A process according to claim 7 wherein the molar ratio of said unsaturate amide to said vinylic sulfur-containing is in the range of from about 0.1:1 to about 60:1.

21. A process according to claim 20 wherein said molar ratio is from about 0.5:1 to about 30:1.

22. A process according to claim 21 wherein said molar ratio is from 1:1 to 5:1.

* * * * *